United States Patent [19]

Hartmann

[11] Patent Number: 4,815,763
[45] Date of Patent: Mar. 28, 1989

[54] SHOCK ABSORBER FOR MOUNTAIN BICYCLES

[76] Inventor: Dirck T. Hartmann, 4121 Morning Star Dr., Huntington Beach, Calif. 92649

[21] Appl. No.: 205,925

[22] Filed: Jun. 13, 1988

[51] Int. Cl.⁴ ............................................. B62K 25/08
[52] U.S. Cl. ..................................... 280/276; 280/275
[58] Field of Search ............... 280/276, 275, 270, 279, 280/280

[56] References Cited

U.S. PATENT DOCUMENTS

| | | | |
|---|---|---|---|
| 1,188,168 | 6/1916 | Genovese | 280/276 |
| 3,083,038 | 3/1963 | Moulton | 280/276 |
| 3,208,767 | 9/1965 | Moulton | 280/276 |

Primary Examiner—Charles A. Marmor
Assistant Examiner—Donn McGiehan

[57] ABSTRACT

The headset of a conventional mountain bicycle is modified to permit the load supported by the front wheel to be transferred to the bicycle frame through a column of compressed air to minimize shock and vibration to the rider when riding over rough ground. A valve matching those in the mountain bicycle tires is located on the steering axis above the handle bar stem and permits the compressed air pressure to be adjusted for different rider weights through use of a conventional bicycle pump. The typical air pressure required with the shock absorber unloaded is less than the tire pressure. The shock absorber design should permit hard use for long periods without maintenance.

2 Claims, 1 Drawing Sheet

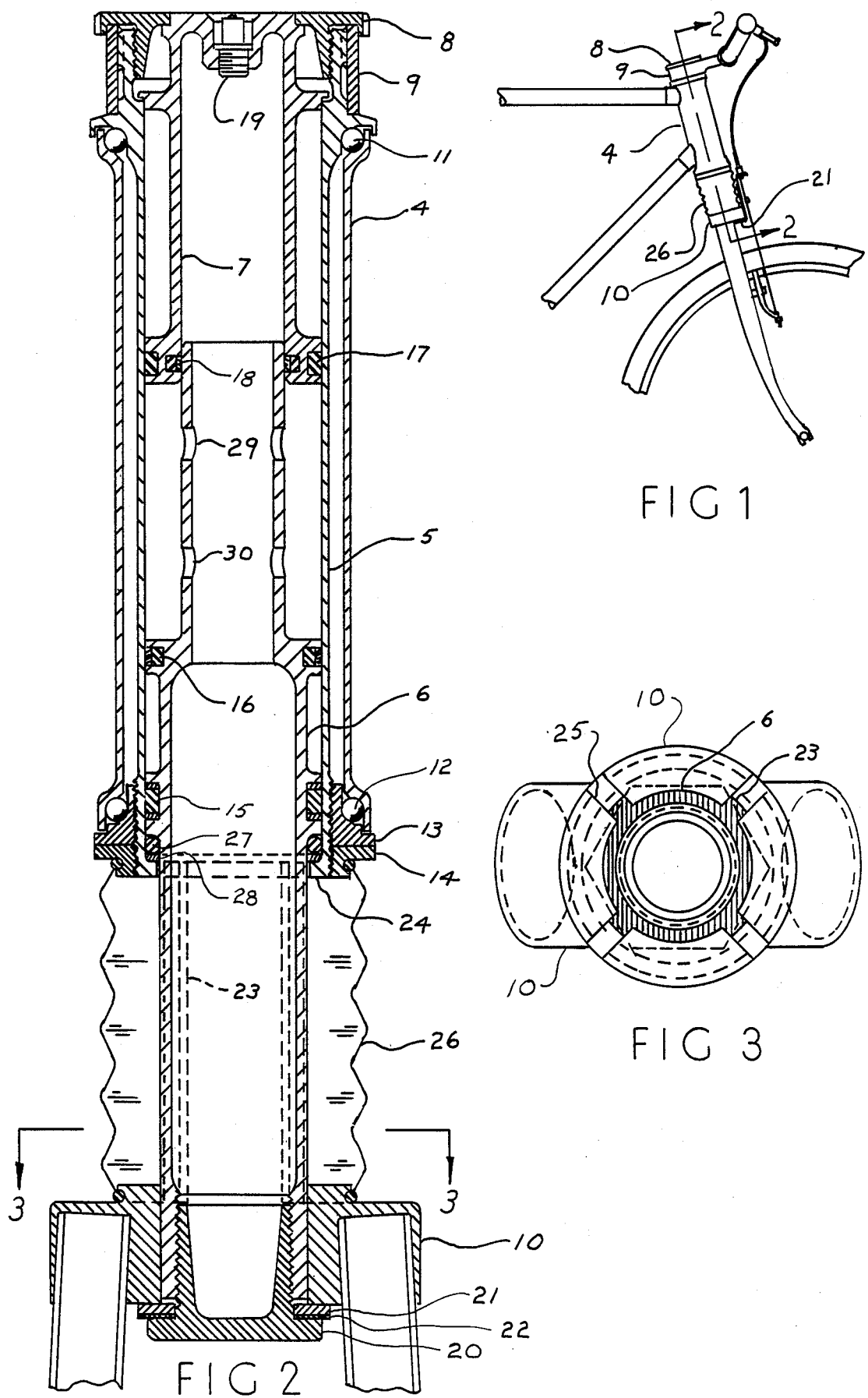

SHOCK ABSORBER FOR MOUNTAIN BICYCLES

This application has features in common with those of my co-pending application for an ATB Shock Absorber, Ser. No. 150,221, filing date Jan. 28, 1988.

BACKGROUND OF THE INVENTION

1. Field of the Invention

This invention relates generally to All Terrain and Mountain Bicycles and to a means for softening the ride over rough ground without sacrificing pedalling efficiency.

2. Description of the prior art

The only shock absorbtion feature of the most widely used Mountain Bicycles is that provided by oversize tires and the flexibility of the front forks. When riding in competition over rough ground on these mountain bicycles, the shock and vibration from gripping the handlebars can cause severe fatigue and cramping of the riders hands and forearms. One model in limited production (The Slingshot) adds flexibility to the frame to reduce the shock and vibration by replacing the down tube with a steel cable which terminates in a compression spring under the bottom bracket, and adding a kevlar spring at the joint between the top tube and the seat tube to allow the frame to flex without breaking. Another model uses a Hannebrink rear suspension with pivoted chain stays and a shock strut for the transfer of load on the rear wheel to the frame which allows the rear wheel to bounce with minimum disturbance to the frame. The cable/spring arrangement provides a slight softening of the ride coupled with a modest reduction in pedalling efficiency, while the Hannebrink arrangement provides considerable shock absorbtion with an equally considerable reduction in both pedalling efficiency and traction. Adding flexibility anywhere along the load path between the handlebars, bottom bracket and rear wheel detracts from pedalling efficiency because the loads imposed through pedalling flex the structure which absorbs energy and reduces the proportion of pedal power delivered to the rear wheel. Therefore, the only way to soften the ride without sacrificing pedalling efficiency is to add shock absorbtion to the front fork while maintening the frame, handlebars to rear wheel, as stiff as possible without adding weight.

SUMMARY OF THE INVENTION

The Shock Absorber for Mountain Bicycles in accordance with the present invention includes a separate steering tube mounted on conventional angular contact ball bearings in the bicycle head tube. A spline is located on the outside diameter of the upper end of the steering tube for mating with the handlebar stem, and the inside diameter of the upper end of the steering tube is threaded. From an interior shoulder below the threaded portion, to an interior flange on the lower end of the steering tube, the interior diameter of the steering tube is honed and polished for mating with a static seal on a plug which seals the upper end of the steering tube, and with a pair of dynamic seals on a separate fork tube which is free to slide axially in the steering tube. On assembly, the fork tube is inserted through the open upper end of the steering tube prior to insertion of the plug. Four orthogonal ribs extending axially along the lower end of the fork tube pass through four slots in the interior flange on the lower end of the steering tube and transfer steering torque from the steering tube to the fork tube while permitting axial sliding of the fork tube. The flange for the lower dynamic seal on the fork tube limits its axial extension. An elastomeric O-ring installed below this flange cushions the contact as the fork tube reaches the end of its deployment stroke. A retainer ring installed above the upper ends of the orthogonal ribs retains the O-ring during stroking of the fork tube.

The lower ends of the orthogonal ribs terminate in slots in the fork crown and a cylindrical portion of the fork tube extending down beyond the ends of the orthogonal ribs is a snug fit in a hole in through fork crown. The interior diameter of the lower end of the fork tube is threaded for engaging a hollow bolt which seals the fork tube through use of a sealant on the threads, and which holds the orthogonal ribs firmly seated in the slots in the fork crown. The hollow bolt also clamps a brake cable bracket against the under side of the fork crown. The front brake cable shroud is anchored to a flange on the upper end of the brake cable bracket. Since the brake cable bracket moves up and down with the wheel, the cable shroud flexes but shock absorber stroking does not affect the action of the front wheel brake.

A fitting threaded into the open upper end of the steering tube clamps the handlebar stem against a flange on the steering tube and retains the plug sealing the upper end of the steering tube. A valve installed in the upper end of the plug allows pressurization of the interior volume with a bicycle tire pump. A dynamic seal in the lower end of the plug engages a reduced diameter portion of the fork tube which slides up and down inside the plug. The annular volume between the reduced diameter portion of the fork tube and the steering tube is closed off at its upper end by the static and dynamic seals on the plug, and at its lower end by the upper dynamic seal on the fork tube. Holes through the reduced diameter portion of the fork tube vent the annular volume to the volume inside the fork tube except when upward sliding of the fork tube carries the holes past the dynamic seal on the plug, after which further upward sliding causes a rapid build up of pressure in the annular volume. This arrangement allows the shock absorber to travel up and down through most of its total stroke with modest pressure change, but prevents the shock absorber from bottoming out whenever a feature of the terrain forces vertical travel greater than the available shock absorber stroke.

Preload of the angular contact ball bearings mounting the steering tube in the head tube is adjusted with a bearing nut threaded on the lower end of the steering tube, and the preload is secured with a locknut threaded onto the steering tube below the bearing nut. The upper end of a molded rubber boot is installed in a circumferential groove in the locknut and the lower end of the boot is installed in a circumferential groove in the fork crown to protect the lubricated orthogonal ribs and the shock absorber interior from dust and dirt.

The annular volume between the upper and lower dynamic seals on the fork tube is filled with oil or light grease on assembly to provide the lubrication required for long dynamic seal life, and the interior surface of the plug is coated with a light grease to serve the same purpose for the dynamic seal on the plug.

The low damping of this shock absorber arrangement should provide maximum vibration isolation for the handlebars while maintaining the rigid connection between handlebars and frame required for maximum pedalling efficiency. Other aspects and advantages of the present invention will become apparent from the following more detailed description taken in conjunction with the accompanying drawings.

BRIEF DESCRIPTION OF THE DRAWINGS

FIG. 1 is a partial side elevation view of a bicycle with the Shock Absorber for Mountain Bicycles according to the present invention in the head tube.

FIG. 2 is an enlarged section taken along the line 2—2 of FIG. 1

FIG. 3 is a section taken along the line 3—3 of FIG. 2

DESCRIPTION OF THE PREFERRED EMBODIMENT

Referring to FIG. 2, The Shock Absorber for Mountain Bicycles in accordance with the present invention includes a steering tube 5 mounted in a head tube 4 on angular contact ball bearings 11 and 12. The bearing preload is adjusted with a bearing nut 13 and secured with a locknut 14. A fork tube 6 is installed through the open upper end of the steering tube 5 prior to installation of a plug 7 which closes off and seals the upper end of the steering tube 5. Referring also to FIG. 3, four orthogonal ribs 23 on the fork tube 6 extend downward through four axial slots through a flange 24 on the lower end of the steering tube 5, and terminate in four radial slots 25 in a fork crown 10. A cylindrical portion of the fork tube 6 located below the lower ends of the ribs 23, fits snugly in a hole through the center of the fork crown 10. A hollow bolt 20 holds the ends of the four ribs 23 firmly fixed in the slots 25, clamps a cable bracket 21 against the lower side of the fork crown 10, and with a room temperature vulcanizing sealant on the threads, seals the lower end of the fork tube 6.

A handlebar stem 9 fits over the outer diameter of the upper end of the steering tube 5 with a spline transferring torque from the handlebar stem 9 to the steering tube 5. A fitting 8 is screwed down on threads inside the upper end of the steering tube 5 and clamps the handlebar stem 9 against a shoulder on the steering tube 5. The fitting 8 also retains the plug 7 inside the upper end of the steering tube 5.

Dynamic seals 15 and 16 are mounted in glands on the fork tube 6 and seal against the leakage of air out the lower end of the steering tube 5. A reduced diameter portion of the fork tube 6 fits up inside the plug 7 and engages a dynamic seal 18 in an internal gland on the plug 7. A static seal 17 in an external gland on the plug 7 seals against the leakage of air out the upper end of the steering tube 5. A bicycle valve 19 is installed in the upper end of the plug 7 and permits adjustment of the shock absorber pressure with a bicycle pump to suit the riders weight.

The flange on the lower side of the gland for the dynamic seal 15 limits the shock absorber extension, and an elastomeric O-ring 27 located between this flange and a retainer ring 28 located above the upper ends of the ribs 23, cushions the end of the deployment stroke.

The ports 29 and 30 in the reduced diameter portion of the fork tube 6 vent the annular volume of air between the lower end of the plug 7 and the gland for the seal 16 to the interior of the fork tube 6 except when the ports 29 and 30 slide past the dynamic seal 18 at which time the remaining volume of air trapped in the annular space limits the continued upward travel of the shock absorber.

A molded rubber boot 26 is installed between a circumferential groove in the locknut 14 and a circumferential groove in the fork crown 10 to prevent the instrusion of contimants.

While this invention has been described in terms of a preferred embodiment, it is anticipated that persons skilled in mechanical design will realize many possible modifications thereof. It is therefore intended that the following appended claims be interpreted as including all such modifications as fall within the true scope and spirit of the present invention.

I claim:

1. A shock absorber providing an improved means of shock and vibration isolation for a mountain bicycle with a conventional frame including a head tube and comprising:

a separate steering tube mounted on angular contact ball bearings in said head tube;

a fork tube slidably mounted in said steering tube with a means for transferring torque from said steering tube to said fork tube and with a length of said fork tube extending below the lower end of said steering tube;

a hollow plug sealing the upper end of said steering tube with a dynamic seal fixed inside the lower end of said hollow plug engaging a reduced diameter portion of said fork tube;

at least one dynamic seal on said fork tube engaging said steering tube and sealing the lower end of said steering tube;

a fork crown rigidly fixed on the lower end of said fork tube with a means for sealing the lower end of said fork tube against the loss of compressed air;

a valve in a closed upper end of said hollow plug for pressurizing the volume within and below said hollow plug with compressed air;

one or more ports in said reduced diameter portion of said fork tube venting compressed air to the interior of said steering tube between said hollow plug and said dynamic seal on said fork tube;

a handlebar stem rigidly fixed on the upper end of said steering tube;

a bearing nut threaded on the lower end of said steering tube for adjusting the preload of said angular contact ball bealings;

a locknut threaded on the end of said steering tube below said bearing nut and securing the preload of said ball bearings; and a boot of elastomeric material installed between said locknut and said fork crown to prevent intrusion of contaminants.

2. A shock absorber for mountain bicycles according to claim 1 wherein said means for transferring torque from said steering tube to said fork tube includes an inward facing flange on the lower end of said steering tube; multiple slots through said flange; and multiple axial ribs on the lower end of said fork tube extending downward through said slots to said fork crown.

* * * * *